(12) United States Patent
Aubry et al.

(10) Patent No.: US 7,734,682 B2
(45) Date of Patent: Jun. 8, 2010

(54) APPLICATION SERVICE PROVIDER METHOD AND APPARATUS

(75) Inventors: Stephane Aubry, Mamaroneck, NY (US); Martin Buscher, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1031 days.

(21) Appl. No.: 10/275,938

(22) PCT Filed: May 5, 2001

(86) PCT No.: PCT/US01/14668
§ 371 (c)(1),
(2), (4) Date: Aug. 21, 2003

(87) PCT Pub. No.: WO01/86391
PCT Pub. Date: Nov. 15, 2001

(65) Prior Publication Data
US 2004/0054717 A1    Mar. 18, 2004

Related U.S. Application Data

(60) Provisional application No. 60/202,899, filed on May 10, 2000.

(51) Int. Cl.
*G06F 15/16* (2006.01)
(52) U.S. Cl. .................. 709/203; 709/217; 709/225; 709/229

(58) Field of Classification Search ............. 709/203, 709/217–219, 223–225, 229; 705/26, 39–41, 705/44
See application file for complete search history.

(56) References Cited

U.S. PATENT DOCUMENTS

| | | | | |
|---|---|---|---|---|
| 5,825,876 A | * | 10/1998 | Peterson, Jr. | 705/52 |
| 6,343,284 B1 | * | 1/2002 | Ishikawa et al. | 705/67 |
| 6,351,813 B1 | * | 2/2002 | Mooney et al. | 713/185 |
| 6,816,882 B1 | * | 11/2004 | Conner et al. | 709/203 |
| 6,859,922 B1 | * | 2/2005 | Baker et al. | 717/125 |
| 6,904,449 B1 | * | 6/2005 | Quinones | 709/203 |
| 6,917,976 B1 | * | 7/2005 | Slaughter et al. | 709/226 |
| 6,931,382 B2 | * | 8/2005 | Laage et al. | 705/67 |

* cited by examiner

*Primary Examiner*—Faruk Hamza
(74) *Attorney, Agent, or Firm*—Osha Liang LLP

(57) ABSTRACT

A new system of granting access to network software services as offered by application service providers (ASPs). Central to the system is the use of smart cards, which combine superior user authentication with flexible containment of relevant user information and the ability to execute small software applications. Once smart cards have been issued to registered customers, all subsequent actions of ordering and using of services are under customer control. Once a relationship is established between provider and customer, any request for service or modification of existing provisions is under direct customer control, allowing close monitoring and even forecasting of cost development.

10 Claims, 6 Drawing Sheets

APPLICATION SERVICE PROVIDER METHOD AND APPARATUS

CROSS-REFERENCE TO RELATED APPLICATIONS

Applicant claims the benefit of the earlier filing date of U.S. application Ser. No. 60/202,899, filed May 10, 2000.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION BY REFERENCE OF MATERIAL SUBMITTED ON A COMPACT DISC OR REFERENCE TO A "MICROFICHE APPENDIX"

Not Applicable.

BACKGROUND OF THE INVENTION (1) Field of the Invention

The subject matter of the present invention relates to a method and an apparatus utilized by an "Application Service Provider" which is hereinafter called "LiveQuest", and, more particularly, to a method and apparatus utilized by an Application Service Provider adapted for providing remote access to software applications, via the internet and the extranet, data generated and used by the software applications, and knowledge generated by the software applications.

(2) Description of the Related Art including information disclosed under 37 CFR 1.97 and 1.98.

Today, oil and gas companies are requesting services that enable them to take advantage of the current electronics communication revolution in their day-to-day work practices without the overhead of acquiring and supporting the necessary hardware and software applications. Therefore, there is a growing market for "Application Service Providers". The concept of an Application Service Provider, or "ASP", is to essentially move the customer's server room to an offsite location. The LiveQuest ASP initiative described in this specification involves the secure delivery of LiveQuest software suites to a worldwide customer base, via the Internet. This approach also enables a company or customer using these applications to outsource the management of the applications and the hardware environments they require.

Oil and gas companies are requesting a wide range of innovative business solutions to support a revolution in day-to-day electronic communications and work practices. As a result, there is a growing market for application service providers, or ASPs. The business model driving ASPs is essentially to move the bulk of the customer's Information Technology infrastructure to an offsite location. To do so, the ASP must provide secure delivery of software suites to a worldwide customer base, via the Internet and/or dedicated lines. This approach also enables the ASP customers to outsource the management of the applications and the hardware environments they require.

Within a given E&P company, a traditional computing environment includes a central room full of powerful servers that maintain files and databases. These servers are linked to user desktop computers in multiple offices, with support provided by peripherals such as printers and plotters. Conceptually, a secure-network ASP moves the server room to an offsite location, in essence stretching the network cable. Since the hardware resides outside the client's premises, the resulting network must include the proper data encryption and firewalls to ensure security and protection of proprietary information. This specification discloses an ASP service, called LiveQuest, which merges software, infrastructure and skilled personnel deployed from LiveQuest data management centers.

At the ASP's offsite location, additional hardware is employed so that existing software products can be run in their native environment. Displays are pushed across the network to a simple Web browser. With software now running on remote servers, the user's desktop environment becomes platform-independent. The user only requires a processor equipped with one of the standard Web browsers, like Netscape or Internet Explorer. This allows delivery of a vast range of software products and solutions to client users without the need to mount applications on individual machines. Such an approach can be applied today for the vast majority of software products offered by companies like Schlumberger Technology Corporation. In the future, remaining highly sophisticated applications, particularly 3D visualization that requires top-end graphic accelerator boards at the desktop, will be available in a similar fashion.

This full-service provision is the end-point of a number of options that LiveQuest can offer. Since the know-how is available to offer full service, clients can be assisted with a spectrum of customized solutions to any problem, ranging from design and implementation, to operation and hosting. For example, Schlumberger Technology Corporation, the owner and operator of LiveQuest, may advise a company on the software, hardware and process requirements necessary to efficiently pipe a major application to PC desktops through that company's Intranet.

The benefits of this approach are numerous. There is a major economy of scale to be gained through broader application of information technology tools. Software pricing becomes more adaptive. Collaboration is improved within and between disciplines. Access to specific applications and software solutions anytime, anywhere, on any device leads to greater efficiency, productivity and more rapid implementation, with fewer problems.

Since the decision to entrust this level of responsibility to an ASP is non-trivial, the Application Service Provider (ASP) must be able to set the client's mind at ease on several potential concerns. The choice should be based on reputation, the spectrum of applications delivered, the quality and consistency of support services, pricing, and hardware capability. Proper selection of people and use of the latest technology is mandatory by the ASP to ensure security, with all confidential information handled responsibly. While stretching the network link between users and provider can potentially increase the possibility of network failure, a dedicated, professional data center operated by a credible ASP can achieve reliability ratings of 99.9% uptime or better. Performance of the applications at the desktop must be equal to or better than what the user is already receiving.

Accordingly, a need exists to provide a service known as an "Application Service Provider" (ASP), including its associated method and apparatus, wherein customers or users may access, via the Internet and the Extranet, the ASP's server and other hardware implementations in order to purchase access to and utilize the ASP's software applications which are resident on that server.

Accordingly, it is a primary object of the present invention disclose and provide an Application Service Provider (ASP) including a method and apparatus which allows customers and users to access, via the Internet and/or the Extranet, the ASP's server and other hardware owned by the ASP for the purpose of purchasing access to and utilizing the ASP's software applications which are stored in the ASP's server.

BRIEF SUMMARY OF THE INVENTION

In accordance with the above object of the present invention, an Application Service Provider (ASP) is a service, which will hereinafter be called "LiveQuest", that allows customers or users to access, via their PCs and the Internet, a remote website owned by the LiveQuest ASP. When the LiveQuest remote website has been accessed, the customer will use a "smartcard", which has previously been issued to that customer, to gain access to certain software applications that are stored in the LiveQuest ASP's server. The smartcard authenticates that customer as being an authorized user of the LiveQuest ASP software applications. The customer is charged based on the amount of time that customer has accessed the software applications stored on the LiveQuest ASP server.

Bearing in mind that LiveQuest is owned and operated by Schlumberger Technology Corporation, the assignee of this application, the LiveQuest application service provider (ASP) solution gives the customer/user easy Internet access to Schlumberger software and information management services. As a LiveQuest user, the user can quickly and easily connect to exploration, geology and geophysics, production engineering, reservoir simulations, drilling, and economic and risk analysis applications, via the Internet, using a standard Web browser without having to install the software on your workstation or personal computer. User data is securely colocated with the application and is managed by skilled information technology (IT) staff with petrotechnical expertise. In accordance with the present invention, the user can create its own ASP environment, choosing from a spectrum of customized solutions, ranging from design and implementation to operation and hosting. For example, Schlumberger personnel can advise another company with regard to the software, hardware, and process requirements which are necessary in order to efficiently connect a Schlumberger UNIX application, such as the GEOFRAME® integrated reservoir characterization system, to the other company's PC desktops through and by way of that company's intranet. The goal of LiveQuest is to make the management of Information Technology (IT) transparent and reliable.

By using the LiveQuest Application Service Provider (ASP), reliable connectivity is achieved through careful carrier management and the latest router equipment. Network security, and application and project access are founded on sophisticated technology, including digital certificates deployed via smart cards. When someone is identified as a trusted user, his entitlement privileges will be verified against his user profile, as stored in a central directory. Once entitlement privileges are established, the user is selectively granted access to specific LiveQuest services including applications, consulting services and even access to other e-business web sites. An application tracks entitlements versus usage both for ordering and billing purposes. Twenty-four hours a day, client support is provided through a call center and on-line help. Software upgrades and performance tuning of applications are included as part of the overall software installation and management process. The infrastructure allows for data loading and quality control, one-on-one training in various applications and consulting, including workflow analysis. This type of outsourcing allows oil and gas companies to focus their efforts on core competencies while, at the same time, gaining the benefits of improved access, greater flexibility and higher reliability.

Although described herein in terms of a system available from the assignee of the present application, Schlumberger Technology Corporation, for access to exploration, production, economic, and risk analysis software via the Internet using a standard Web browser, those skilled in the art will recognize from this disclosure that the invention is not so limited. The invention is intended for use in any environment in which the applications reside on the provider's server for remote access by users. Specifically, the present invention provides a method by which the application service provider (ASP) need not administer all users of the application; instead, the ASP provides user access to specific programs by empowering the user's manager and the user's manager then provides use privileges to individual users by a system of entitlements that give access to specific programs residing on the ASP's server for specific periods of time.

According to a further aspect of this invention, there is provided an application service provider apparatus comprising a server capable of providing a plurality of identified application services, the server being adapted to receive control signals from an operator or user, and to respond to the control signals such that when the server receives subsequent predetermined control signals, the server provides a selected group of services selected from the services that the server is capable of providing.

According to another aspect of this invention, there is provided an application server provider apparatus, the apparatus comprising a server, the server being capable of providing a plurality of identified application services, the server being associated with a discriminator to receive and discriminate predetermined signals, and also being associated with a memory adapted to store the identity of selected services of said plurality of services, and a parameter relating to a selected predetermined signal, the server being adapted to be connected to a computer and adapted to receive a predetermined signal from the computer, the discriminator being adapted, on receipt of that predetermined signal, to actuate the memory, to enable an operator of the computer to introduce, into the memory, the identity of services selected by the operator of the computer from the plurality of services, and also to cause the memory to store a parameter relating to a further selected predetermined signal, the server then being adapted, in response to the further predetermined signal, to enable the server as far as the selected services stored in the memory are concerned.

In a practical embodiment of the invention, the server and the associated memory are at one location. The server may be connected to a computer, for example through the Internet, or through an extranet. Thus the computer may be at a remote location from the server and the memory. Am operator may operate the computer, the operator may be a manager who is authorized to operate the computer. The manager may be able to display her authorization by providing a password, or a password in association with a user name. Alternatively, the manager may be able to demonstrate her authority by means of possession of a machine-readable card such as a smart card, and may further have to introduce a specific number or "PIN" in order to complete demonstration of authority. As the manager performs the appropriate routine to demonstrate her authority, the computer that the manager is operating will send a predetermined signal, that signal being received by the server, and being identified by the discriminator present within the server. When the discriminator has confirmed the authority of the operator, the operator may then effect control on the server so as to gather groups of services, and to associate those groups of services with a signal relating to a further operator of the server. Thus the manager may gather together a group of services and then provide signals representative of a password, or may gather together the group of services and introduce a further smart card into a smart card reader so that signals representative of that smart card may be associated with the group of services.

When the further operator then wishes to access the predetermined group of services, the further operator sends the appropriate signals to the server, be it by providing the password or be it by introducing the smart card into a card reader, and the server then enables the selected group of services.

In this way, the first operator of the computer can effectively configure the server so that, for each of a number of selected operators, an appropriate group of services will be enabled whenever the appropriate operator accesses the main server and provides the appropriate identifying signals, such as password or smart card signals.

Preferably the plurality of identified application services include at least some items selected from: computer programs, computer software, one or more computer databases, hard-drive space, and processing capability.

Conveniently, the provider is connected to a computer, the computer being provided with means to generate said predetermined signals. In one embodiment, the means to generate said predetermined signals comprises a keyboard adapted to generate a password signal and/or the name of the user signal. In an alternative embodiment, the means to generate said predetermined signals comprises a reader adapted to read a machine-readable card. Conveniently, two readers are provided, each adapted to read a machine-readable card. In using an embodiment of this type, the first operator may use one smart card reader for her own smart card, so that her authority is demonstrated to the server. The first operator may introduce a second smart card, which is to be the smart card of the person who is actually to access the services provided by the server, into the second smart card reader while identifying the group of services to be enabled when signals from the particular smart card are again forwarded to the server.

It will be appreciated that while each reader is adapted to read a smart card, each reader may be adapted to read any type of machine-readable card carrying optical or magnetic information. However, in the preferred embodiment, the apparatus is in combination with at least one smart card, the smart card itself incorporating memory, the memory containing data readable by the smart card reader.

Conveniently, the server is associated with a further memory, the further memory being adapted to contain a credit value, means being provided to decrease the credit value in dependence upon the identity of the service enabled, and the duration of the enablement. The further memory is thus of a credit meter and the first operator may introduce an appropriate credit level into this further memory. As the authorized user then accesses the various services, appropriate credits may be subtracted from the total contained in the memory depending upon the precise operating parameters of the server. Credit values may be subtracted, for example, if a particular service is accessed for more than a predetermined period of time, or other charging structures may be utilized.

It will thus be understood that the server is adapted so that when the memory has been actuated in response to a predetermined signal, the server is responsive to signals from a computer to introduce a credit value into the further memory, and to associate the said further memory with the said memory which is adapted to contain the identity of the selected services, and the parameter relating to a further selected predetermined signal.

It will be understood that the said memory is adapted to store a plurality of groups of identities of services, with each group being associated with a parameter relating to a respective further selected predetermined signal. In this way, the first operator is enabled to configure the server so that the server will operate in a satisfactory manner when accessed by a plurality of different operators, each requiring access to a different combination of services on the server.

According to a further aspect of this invention, there is provided a method of providing an application service comprising the steps of establishing a server facility configured to provide a plurality of application services, and providing predetermined signals to the server such that when the server receives further predetermined signals, the server will enable selected services from the services that the server is capable of providing.

According to another preferred aspect of this invention, there is provided a method of providing an application service, the method comprising the steps of establishing a server facility, and configuring the server to be capable of providing a plurality of identified application services selected from computer programs, computer software, one or more computer databases, hard drive space, and processing capability, and comprising the steps of providing a computer operator, who has access to the server, with means to enable the computer operator to provide predetermined signals to the server, thus identifying the operator, and configuring the server so that when the server is accessed by an operator in this way, the operator may select one or more groups of services from the services available through the server and to associate, with the or each selected group of services, a further identification signal to identify a further operator, the server further being configured so that when in receipt of a said further signal, the server provides access to the thus-identified operator to the appropriate selected group of services.

Conveniently the server is additionally configured so that the first operator may associate, with each identified user, a credit value, and the server is configured to subtract from that credit value when predetermined services are used, by that operator, for predetermined periods of time.

BRIEF DESCRIPTION OF THE SEVERAL VIEWS OF THE DRAWING(S)

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

Referring now to the figures, FIG. 1 illustrates a fist embodiment of the Application Service Provider of the present application;

DETAILED DESCRIPTION OF THE INVENTION

Figure 1:
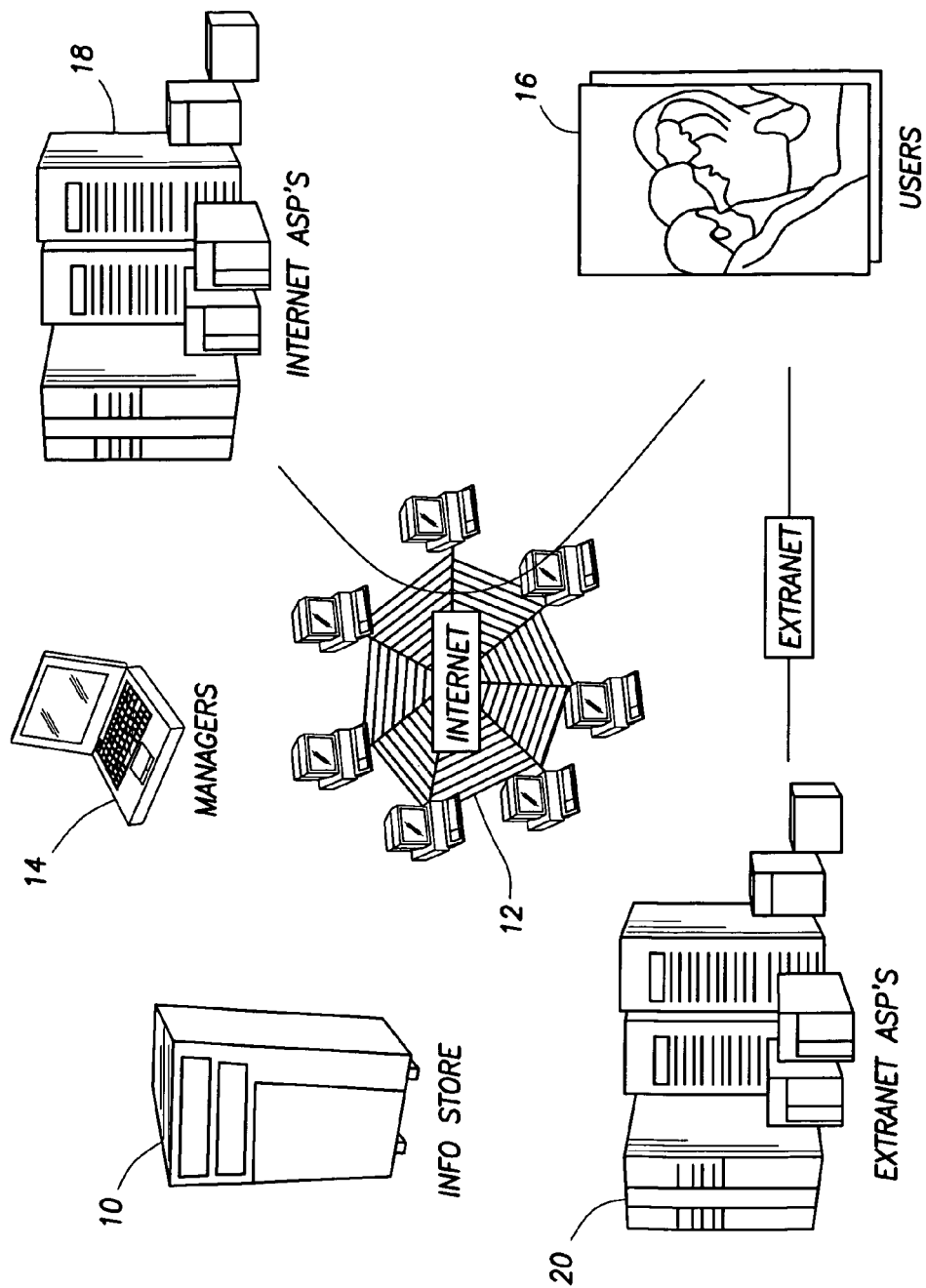

The primary purpose of an Application Service Provider (ASP) is to encourage customers or users to use a vendor's software without selling the vendor's software to the customer and storing the software on the customer's workstation or personal computer. In addition, it is necessary to allow the vendor to control which user can gain access to which particular ones of the vendor's software. In addition, it is necessary to enable the vendor to determine: (1) when a particular user logs into the vendor's website to use the vendor's software, (2) when the particular user logs out from the vendor's website, and (3) what system resources belonging to the vendor were used by the user. This type of information is required by the vendor because the vendor will be billing the customer or user for the customer's use of the vendor's 'service'. Whereas in the prior art, the customer would buy the software from the vendor, now the customer will be buying the 'service' from the vendor on a time basis. During that 'service', the customer will be allowed to gain access to and use the vendor's software. Consequently, the Application Service Provider (ASP) of the present application will enable the vendor to control what software the user/customer actually uses, and to give the customer/user the decision making ability to determine which ones of the vendor's software to utilize.

In the prior art, the customer would purchase a license from the vendor to use the vendor's software, the customer sends a purchase order to the vendor, the vendor, using certain ones of his 'middle-men', processes the purchase order, and sometime later, the customer receives a CD-Rom from the vendor containing the purchased software. If the customer decides to make a change (i.e., he decides to purchase additional or other software from the vendor), the above process must be repeated. Therefore, in the prior art, the customer is the decisionmaker, but the customer is not the one who is initiating the steps necessary to gain access to the vendor's software. Rather, the vendor is initiating those steps. This is not an efficient procedure in view of the new e-commerce or 'Internet' based systems in use today.

However, by using the Internet based systems in use today, the Application Service Provider (ASP) of the present invention will allow the customer to be both the decisionmaker and the one who is initiating the steps necessary to gain access to the vendor's software. That is, by using the ASP of the present invention, the vendor's 'middle-man' is by-passed. Thus, a more time efficient, e-commerce-based method and apparatus is disclosed in this specification, in the form of an 'Application Service Provider' or ASP. The ASP of the present invention allows the customer/user himself to implement and take all of the steps which are necessary to access the vendor's software without, simultaneously, requiring the customer to purchase the software from the vendor and store the vendor's software on the user's workstation or personal computer.

Referring to FIG. 1, a first embodiment of the Application Service Provider (ASP) of the present application is illustrated. In FIG. 1, an Infostore 10 represents a computer with a database linked to the Internet 12. A customer/user or 'manager' 14 (where the 'manager' is an externally located paying customer) can dial-up and attempt to obtain access to the Infostore 10 via the Internet 12. When the manager 14 has accessed the Infostore 10, the manager 14 can look at a catalog of services stored in the Infostore 10, and the manager 14 can purchase 'some or all of these catalog of services' for ultimate use by the manager 14 himself or for ultimate use by certain ones of the manager's delegates, called users 16 (where the users 16 are also externally located paying customers). Since the manager 14 has purchased 'some or all of these catalog of services' stored in the Infostore 10, the users 16 now have a right to use some or all of the vendor's software inherently contained within the aforementioned 'some or all of these catalog of services' stored in the Infostore 10. In FIG. 1, there are two sets of servers: the Internet ASP's 18 and the Extranet ASP's 20. The Internet ASP's 18 server is accessible to the user 16 via the Internet 12. However, the Extranet ASP's 20 server is directly accessible to the user 16 (i.e., the Extranet ASP's 20 servers are not accessible to the user 16 via the Internet 12). The Infostore 10 is communicable through the Internet 12 to both the Internet ASPs 18 and the Extranet ASPs 20. Therefore, the vendor's software stored in the Infostore 10 is communicable to the Internet ASP 18 via the Internet 12, and the vendor's software stored in the Infostore 10 is communicable to the Extranet ASP 20 via the Internet 12. However, the users 16 can access the vendor's software stored in the Internet ASP 18 only by first accessing the Internet 12. On the other hand, the users 16 can access the vendor's software stored in the Extranet ASP 20 by directly accessing the Extranet ASP 20 (i.e., in this case, it is not necessary to first access the Internet 12). Therefore, in FIG. 1, in accordance with the present invention, information concerning what rights the users 16 have purchased is stored on the Infostore 10 and is managed by the customer directly (i.e., by the manager 14). The manager 14 communicates with the Infostore 10 via the Internet 12 and performs the following functions: he orders services for his users 16, monitors the progress of his users 16 (recall that the users 16 are concurrently using certain ones of the vendor's software stored in the Infostore 10 by accessing either the Extranet ASP 20 servers directly or by accessing the Internet ASP 18 servers via the Internet 12), and buys more services for his users 16 if necessary.

Figure 2:
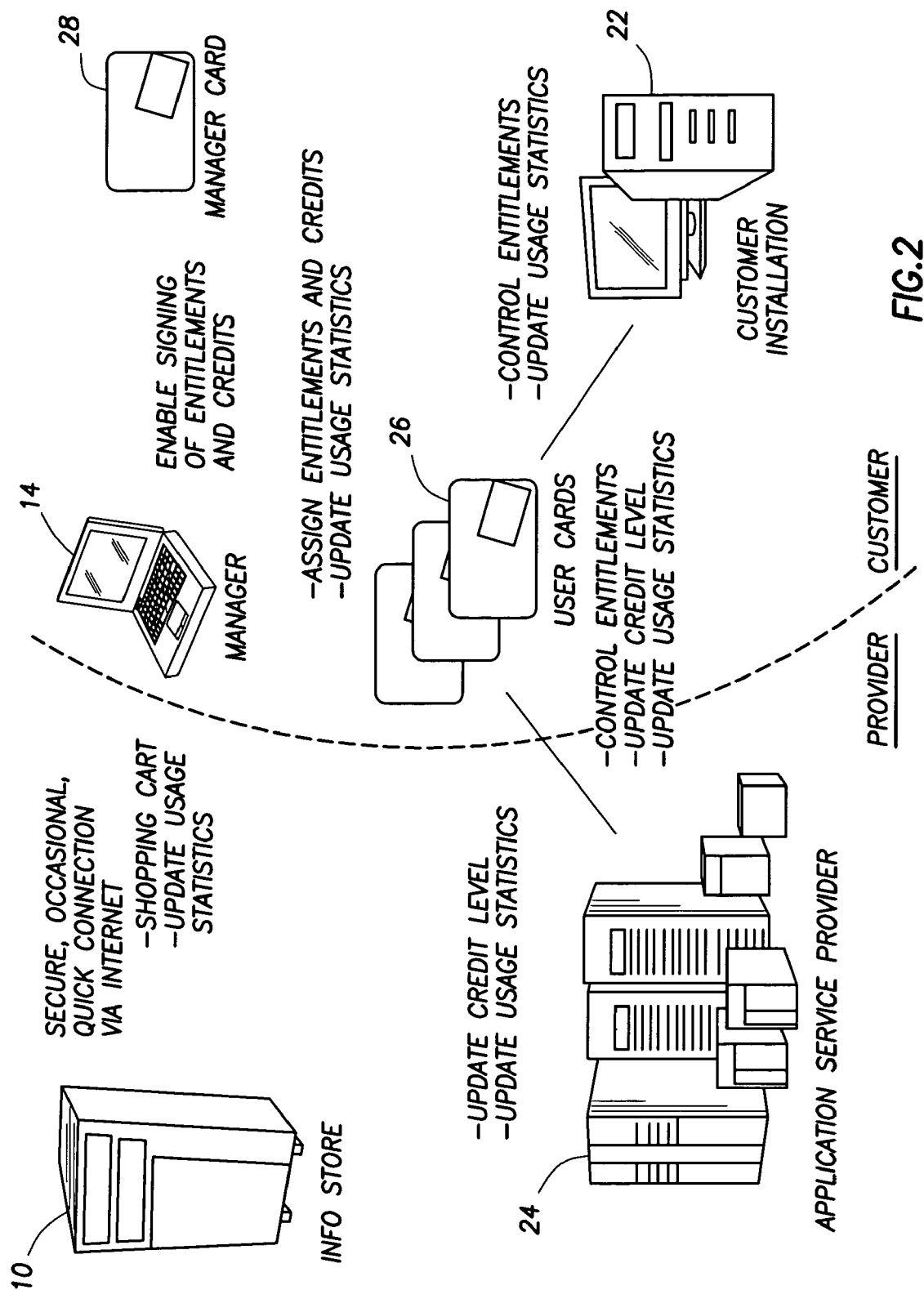
FIG. 2 illustrates a second embodiment of the Application Service Provider of the present application.

Referring to FIG. 2, a second embodiment of the Application Service Provider (ASP) of the present application is illustrated. In FIG. 2, the Infostore 10 is the master keeper of information regarding what services were ordered by the manager 14 and what rights a certain customer like the manager 14 has obtained. The manager 14, hereinafter called a 'manager/user 14', is connected to and can access an Application Service Provider 24. In addition, the Application Service Provider 24 is operatively connected to the Infostore 10. In operation, when the manager/user 14 connects to the Application Service Provider 24, the Application Service Provider 24 will check the Infostore 10 to determine whether the manager/user 14 has the right to use certain software applications A, B, and C stored in the Infostore 10. While the manager/user 14 is using those software applications A, B, and C, a record is kept in the Infostore 10 pertaining to the amount of 'time' the manager/user 14 is using the software applications A, B, and C. If that 'time' is within certain limits, the manager/user 14 is not charged an extra amount of money; however, if that 'time' exceeds those certain limits, an extra amount of money is charged to the manager/user 14. Consequently, information is continuously exchanged between the Application Service Provider 24 and the Infostore 10 in FIG. 2 while the manager/user 14 is connected to and is accessing the Application Service Provider 24. In FIG. 2, a plurality of 'smart cards' 26 are used in the implementation of FIG. 2. In addition to the manager 14, a plurality of users will report to the manager 14. The plurality of smart cards 26 are used, respectively, by the plurality of users, there being one smart card 26 used by each of the plurality of users. These 'smart cards' 26 are not credit cards. The 'smart cards' 26 are used primarily in connection with a high level of authentication or security. That is, one primary purpose of the 'smart cards' 26 is to identify the manager 14 or the user as a trusted customer. Therefore, when the manager 14 orders services, the Application Service Provider 24 knows, via the 'smart cards' 26, that the manager 14 is a trusted source and, therefore, certain rights can be given to the manager 14 and an invoice can be prepared and sent to the manager 14. The smart cards 26 each have their unique identifiers and certificates so that only one such card together with a PIN number will identify a person, such as the manager 14. In FIGS. 1 and 2, the manager 14 has a manager smart card 28 in FIG. 2. When the manager 14 accesses the internet 12 of FIG. 1 and then accesses the Infostore 10, the manager 14 is presented with a standard purchase catalog. The manager 14 of FIG. 2 will review the catalog and fill his 'shopping cart' 30 of FIG. 2. The items in the 'shopping cart' 30 are intended for use, not by the manager 14 himself, but by a separate set of 'users' who work with that manager 14. Therefore, the manager 14 fills his 'shopping cart' 30 with different subsets of software applications adapted to the use of each user thereby entitling each of the user smart cards 26 with access to a specific subset of software applications. The information relative to the privileges of each user is kept in a policy server that is part of the InfoStore 10, both in terms of access to applications and in access to data sets.

The manager 14 now gives the user A's smart card 26 to user A (who could be, for example, a geologist). The user A, having received the user A's smart card 26 from the manager 14, sits down in front of a user A's personal computer, and then user A places the user A smart card 26 into a card reader attached to the user A's personal computer. The user A swipes the user A smart card 26 through the card reader of user A's personal computer. This action connects the user A (who is sitting in front of his personal computer) to the Application Service Provider 24 in FIG. 2. At this point, the user A starts his work. While the user A is working, the ASP 24 communicates with the Infostore 10 to inform the Infostore 10 that user A is using a certain amount of CPU time and disk space. In FIG. 2, each of the smart cards 26 store the following items of information. One such item of information is an 'entitlement' which indicates: which particular pieces of software stored in the Infostore 10 can the user have access? Another such item of information is called 'credits' which is similar to a currency. Another such item of information is 'what projects can the user have access'? Still another such item of information is called 'update usage statistics'. With regard to the item entitled 'credits', assume, for example, that a certain service with a base set of features is offered, and further assume that this service has the following plurality of 'parameters' associated therewith: 40 hours of connection time per month, 2 hours of CPU time, and 8 megabytes of disc space. Each additional connect time hour will cost the user one credit and each additional megabyte will cost the user an additional 'x' credits. Therefore, when the plurality of 'parameters' have been exceeded by the user, an additional number of 'credits' will be charged to that user. If that number of 'credits' exceeds a particular amount of 'credits', that user can be charged extra money. With regard to the item entitled 'what projects can the user have access', this asks: to which projects can the user have access? This is the case wherein company A has a partnership with company B and company A wants to share certain data with company B. Therefore, company A sends a smart card 26 to company B, the smart card 26 indicating, for example, that, for one month, one user in company B can review a particular project and help company A in that project. With regard to the item entitled 'update usage statistics', this asks: what software was actually used by the user. This is a record that indicates: which pieces of software did the user actually use, starting from a first time 1 to a second time 2. In FIG. 2, a customer installation 22 is illustrated. This customer installation 22 is used when there is no internet (such as internet 12 in FIG. 1) between the customer and Infostore 10 which would allow the customer to interconnect between the customer's office and the Infostore 10. The smart cards (such as the smart cards 26 in FIG. 2) can still be charged-up to identify the software stored in the Infostore 10 that the customer can access, and this action can take place once every year, for example. Statistics are uploaded to the smart card to indicate times when the software was used.

In operation, referring to FIGS. 1 and 2, assume that a small oil company decides to use an ASP for an upcoming prospect evaluation. Using the ASP website (the user 16 connects to the Internet ASP 18 via the internet 12 of FIG. 1), the IT manager of the small oil company requests service for 3 users. The ASP sends 3 blank user cards, plus one manager card. An email is sent to the manager with PIN numbers for all the cards. The IT manager receives the smart cards and puts the manager card in his card reader. After entering the PIN number, a web browser window appears and a secure connection is established to the Infostore 10. Using a catalog of services, the manager puts together a shopping cart for each of the 3 users, e.g., one for a geologist, one for a geophysicist, and one for a reservoir engineer. After inserting the user cards into a second card reader, the IT manager drags the shopping carts over its respective desktop icon to update the card. A transaction confirmation dialog is offered similar to on-line stock trades. Concurrently, the Infostore 10 updates its logical copies of the smart cards 26 and generates an invoice. The manager then hands out the user smart cards to the 3 users, who subsequently burn up their credits for the services to which they are subscribed.

Figure 3:
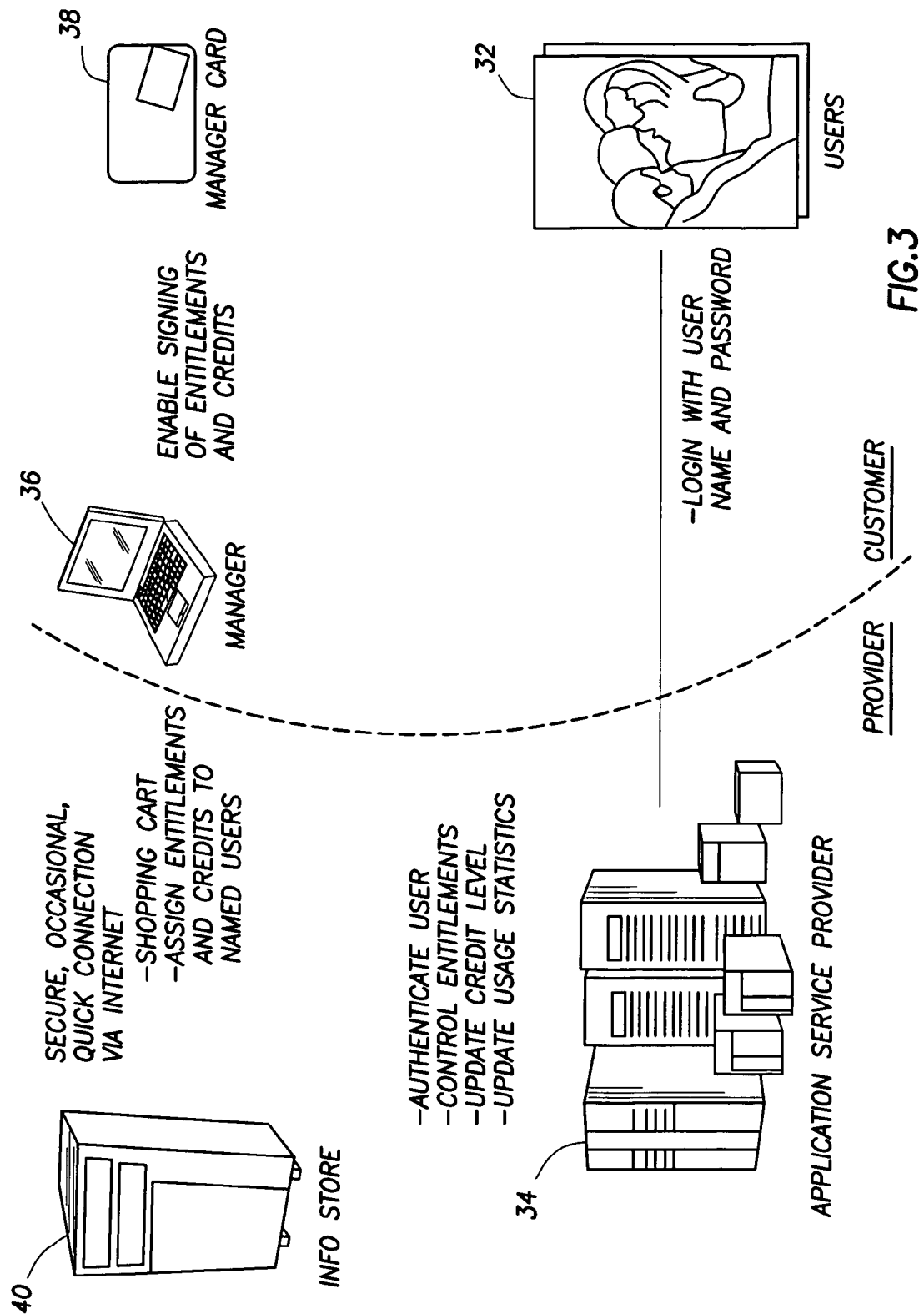
FIG. 3 illustrates a third embodiment of the Application Service Provider of the present application.

Referring to FIG. 3, a third embodiment of the Application Service Provider (ASP) of the present application is illustrated. In FIG. 3, this embodiment is a much simplified version of FIG. 2 since, in FIG. 3, no user smart cards are being used. In FIG. 3, the users 32 attempt to access an Application Service Provider 34, the users 32 being authenticated as being a trusted set of users by requiring the users 32 to input a 'username' and a 'password'. However, the manager 36 is still using a smart card 38 in order to purchase the use of software applications stored in the Infostore 40. Recall that the manager 36 must insert the smart card 38 into his personal computer card reader and swipe the smart card 38 through that card reader in order to subsequently purchase the use of certain software applications and other services from the Infostore 40. Consequently, since the manager 36 is required to use the smart card 38 to purchase services, all of the manager's financial security issues are addressed. However, the manager 36 use of the smart card 38 is a relatively rare action since the manager 36 does not use the smart card 38 very often; on the other hand, the user 32 actions take place on a daily basis. Therefore, the embodiment of FIG. 3 inherently contains less overhead, but it also has a lower level of security because the users 32 are not required to use a smart card to authenticate themselves.

When the manager 36 of FIG. 3 or the users 26 of FIG. 2 insert their smart cards in their card readers attached to their laptop or personal computers, the following actions take place. In response, the system senses that a smart card has been inserted into the card reader, and a window suddenly appears on the display screen of the personal computer, the window asking: type in your PIN number. When the PIN number is typed, the particular personal computer where the PIN number was typed and where the smart card was inserted is "authenticated". That particular personal computer is then connected to a webpage which represents the Infostore 40 (or infostore 10 in FIG. 2). The infostore 40 then knows that the person sitting in front of that particular personal computer is a "trusted source". As a result, the infostore 40 (20 in FIG. 2) then knows that it can show the person sitting in front of that particular personal computer a "catalog of services". The Infostore 40 does not want the catalog of services to be open for all to see, and, in some cases, the catalog of services is customized for a particular customer. For example, for high volume customers, the prices in the price list of the catalog of services may be reduced.

Figure 4:
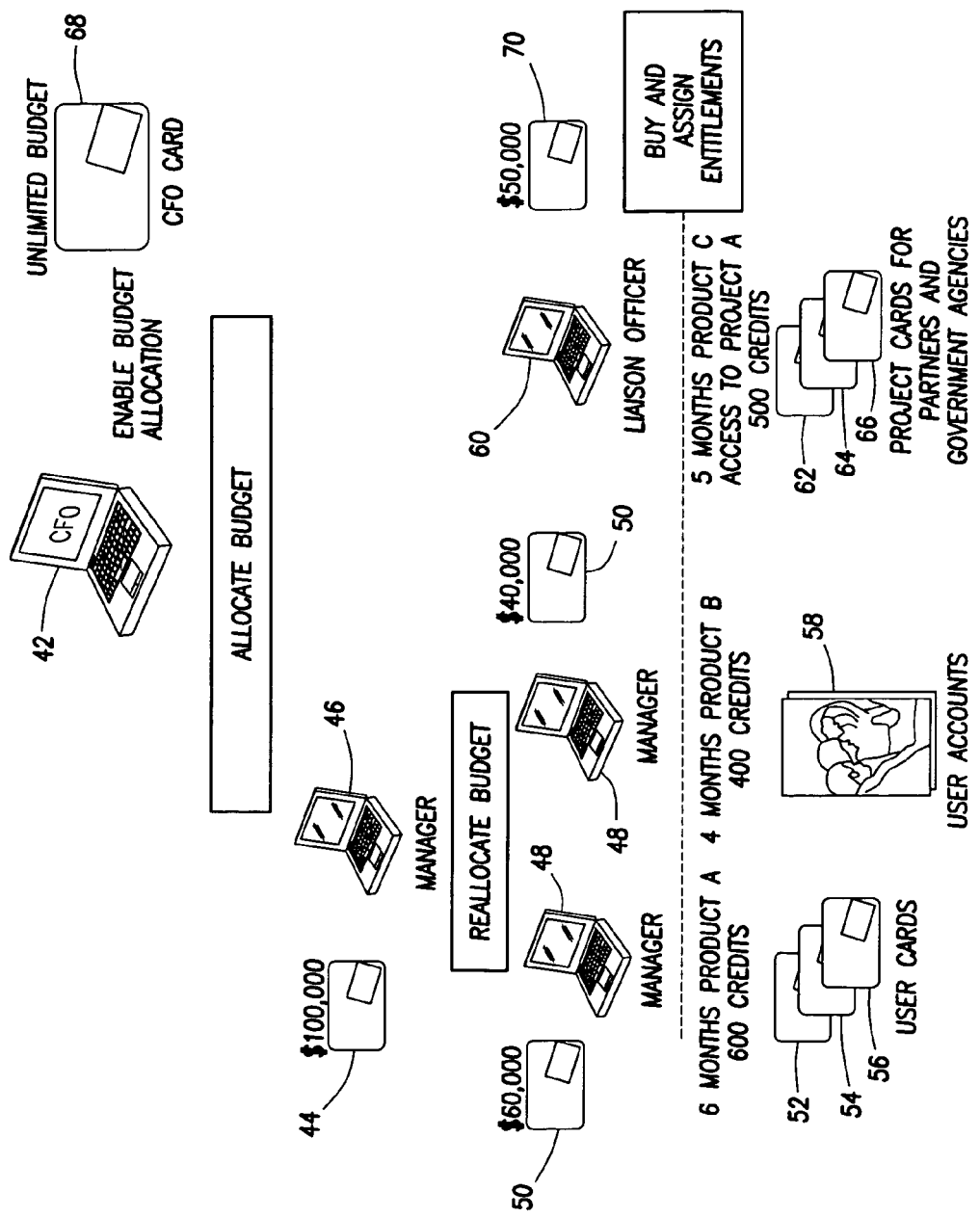
FIG. 4 illustrates a more detailed embodiment of the manager smart card.

Referring to FIG. 4, a more detailed construction of the manager smart card 28 in FIG. 2 and 38 in FIG. 3 is illustrated. In FIG. 4, while there is one manager 14 in FIG. 2 and one manager 36 in FIG. 3, in FIG. 4, there are a plurality of managers. A chief financial officer (CFO) 42, who is the chief officer in charge of allocating a budget to lower level managers, has his own CFO manager smart card 44. The CFO 42 would allocate a certain budget to either end users directly or to other managers. For example, assume that, on the CFO manager smart card 44, an allocation of $100,000.00 is stored on the smart card 44 for the use of software stored in the Infostore 10 for the year 2000. This $100,000.00 amount can be divided up for use by various sub-managers and subordinate sub-managers. In FIG. 4, for example, the CFO 42 inserts his smart card 44 into his personal computer and indicates that a first sub-manager 46 can access the card 44 and re-allocate the $100,00.00 budget amount among two other subordinate sub-managers 48 and 50. The first subordinate sub-manager 48 can then use the smart card 44 to re-allocate his $60,000.00 budget amount among three users 52, 54, and 56, each having their own smart card, indicating that these three users 52, 54, and 56 can use product A for 6 months and is entitled to 600 credits. The second subordinate sub-manager 50 can use the smart card 44 to re-allocate his $40,000.00 budget amount among three other user accounts 58, said user accounts 58 being entitled to use product B for 4 months and is entitled to 400 credits. In the meantime, the CFO 42 can use his smart card 44 to indicate that a Liason officer 60 can re-allocate his $ 50,000.00 budget amount among three other users 62, 64, and 66, each having his own smart card, who are, for example, partners and government agencies. The smart cards for the users 62, 64, and 66 would indicate that said users can use product C for 5 months and is entitled to 500 credits. Consequently, in FIG. 4, the manager smart card 44 for CFO 42 would allow the CFO 42 to maintain control over the money in the budget which must be spent.

Figure 5:
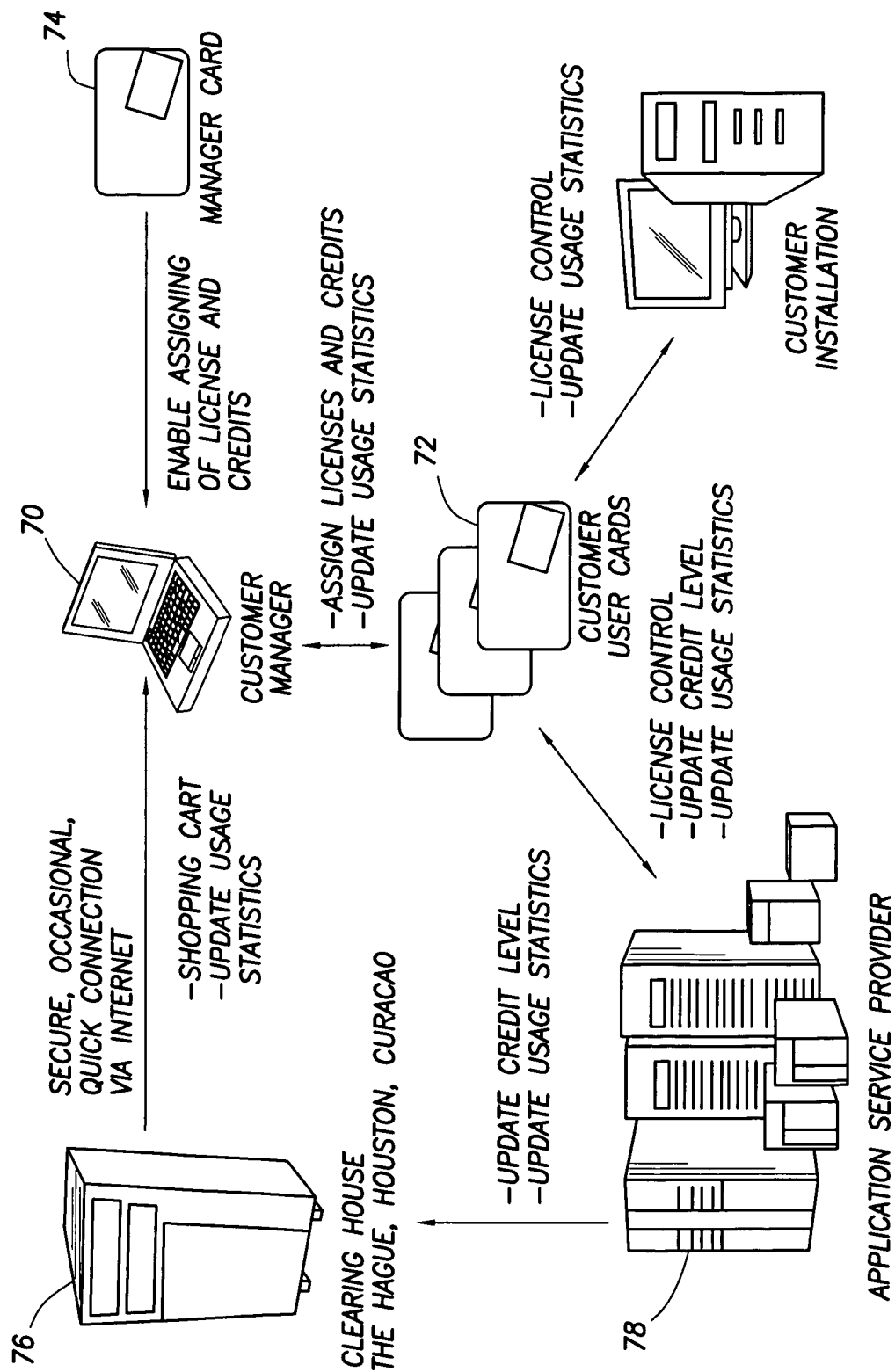
FIG. 5 illustrates a fourth embodiment of the Application Service Provider of the present application.

Referring to FIG. 5, a fourth embodiment of the Application Service Provider of the present application is illustrated. In FIG. 5, assume that a small oil company (hereinafter, a 'customer') decides to use the Application Service Provider (ASP) of your company hereinafter called "GeoQuest) for an upcoming prospect evaluation. Using the ASP website on the Infostore 10 of FIG. 1, the customer requests three smart cards for 3 of his users. GeoQuest sends 3 blank smart cards/ user cards 72 and one manager card 74 to the customer. In particular, GeoQuest sends the 3 blank smart cards/user cards 72 and the one manager card 74 to the 'customer manager' 70. GeoQuest sends an email to the customer manager 70 telling the manager 70 the PIN numbers for each of the smart cards 72, 74. The customer manager 70 puts the manager card 74 into his card reader. After entering his PIN number, a web browser window appears and a secure connection is established to the Clearing House 76. Using a catalog of services, the customer manager 70 puts together a shopping cart for each of the three (3) users 72, e.g., one for a geologist, one for a geophysicist, and one for a reservoir engineer. Inserting the user cards 72 into a second card reader, the customer manager 70 drags the shopping carts over the respective desktop icons in order to update the user cards 72. A transaction dialog is offered similar to on-line stock trades. Concurrently, the clearing house 76 updates its logical copies of the smart cards, and generates an invoice. The customer manager 72 then gives the user smart cards 72 to the three (3) users, who then use their individual smart cards 72 to bump their credits in connection with the services to which they are subscribed. The users 72 would use their smart cards 72 to access an Application Service Provider 78. The Application Service Provider 78 would retrieve certain software applications from the Clearing house 76 for use by the users.

Figure 6:
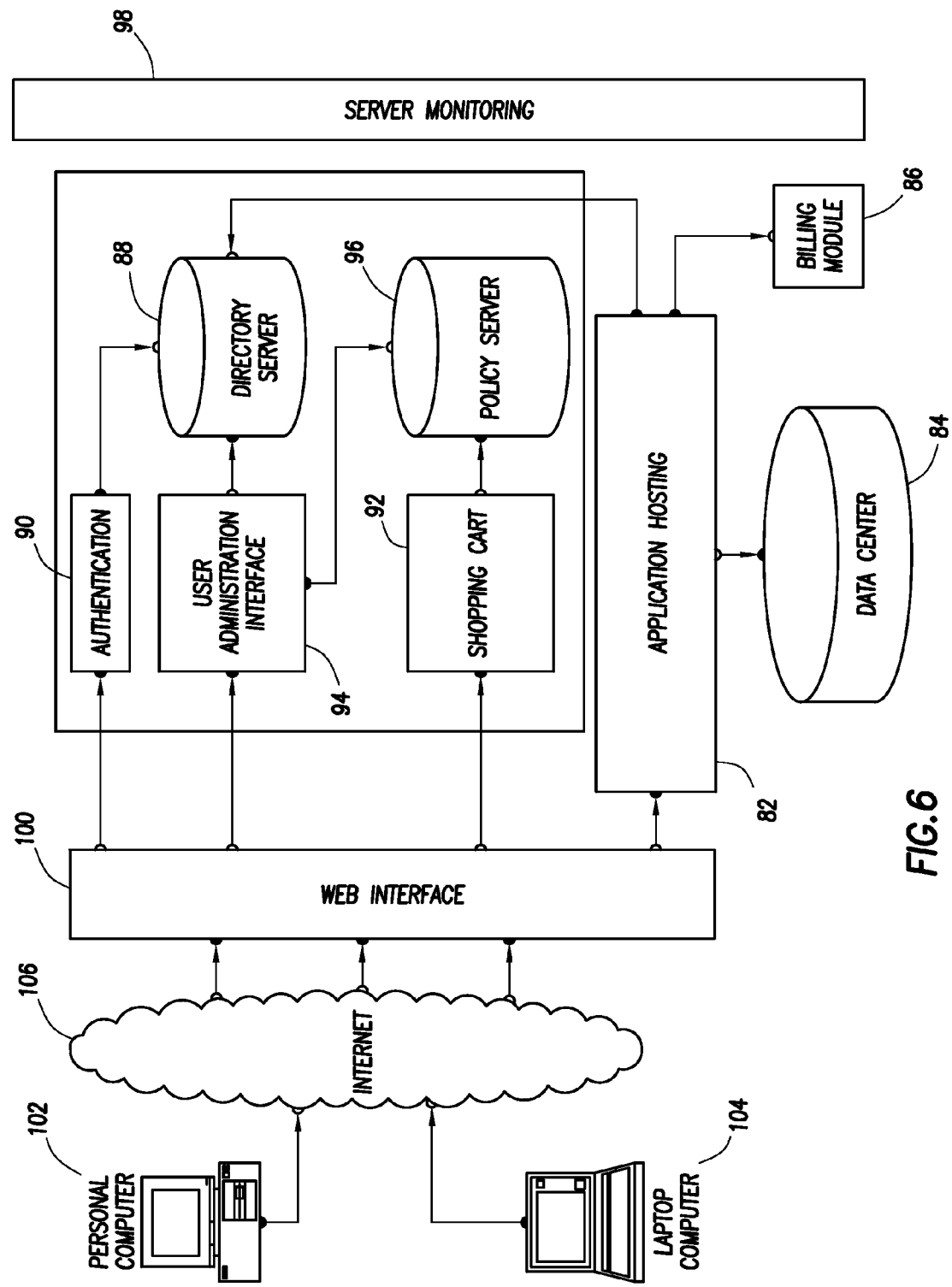
FIG. 6 is a schematic representation of the Infostore that comprises one component of a preferred embodiment of the apparatus of the present invention and the interaction between that component and the remote user of that apparatus.

Referring to FIG. 6, a schematic representation of the Infostore that comprises one component of a preferred embodiment of the apparatus of the present invention and the interaction between that component and the remote user of that apparatus is illustrated. A large part of the value created by the ASP model comes from the savings that clients derive from outsourcing a significant share of its own IT infrastructure. This is especially true for small companies that lack the size and resources to justify the ownership of costly equipment and in-house support by qualified personnel. However, with the technology content of businesses increasing, continued tightness in skilled labor markets and outsourcing transaction costs falling, the threshold size below which direct ownership of the IT infrastructure is uneconomical will grow larger. This will stimulate a demand for IT outsourcing that we can address, building on Schlumberger's longstanding relationship with oil companies and technical expertise in building; integrating and operating complex Information Technology systems. LiveQuest's IT infrastructure offering will include three major components:

- Network infrastructure—The provision of connectivity, network and security equipment including switches, routers and firewalls to securely connect customers to their data and applications using the Internet and/or dedicated lines.
- Application hosting 82—The provision of computing resources to run software applications and serve their content from the Data Center 84 to remote customers.
- E-commerce engine—This includes the hardware and software to routinely perform typical business functions on the web such as entitlement, server monitoring 98, marketing, customer management and billing services (e.g., via a billing module 86).
- Storage—The provision of secure and managed disk-based storage were customer projects can be stored. This also includes periodic backup services.
- Disaster recovery infrastructure—The provision of equipment to ensure that customer data is protected and that the availability of the LiveQuest service is maintained.

The present invention also delivers value added services aimed at supplementing the ancillary capabilities of the ASP's software and making its usage more efficient. The following services (and additional services that will be apparent to those skilled in the art from this description) can optionally be marketed as "premium" add-ons to the basic offering and facilitated by a tight integration with the ASP's desktop environment.

Interpretation consulting—Interpretation consulting will be targeted at project managers and decision-makers that need second opinion in the context of time and operation critical situations. While potential clients may belong to various size segments, this service will be particularly useful for partnerships in which companies have different work methodologies or single companies that operate in a very complex environment requiring rare interpretation skills. However, potential targets may also include small companies that wish to temporarily expand the size of their staff to cope with an activity overload.

While interpretation services already exist on a standalone basis, their integration with ASP services will improve both their quality and efficiency. Typical interpretation consulting involved the mailing and loading of electronic data prior to any analysis work that increased the response time significantly. Here, the user will already have their data loaded on the ASP's servers, ready for immediate and interactive interpretation services at the click of a button.

Application training—As of today, application training is essentially performed in classrooms using traditional methods of teaching and teaching can still be delivered in this way to the users. However, with bandwidth becoming cheaper and more available, training can be delivered online in virtual classrooms and support voice, video and the screen sharing functionalities that are the base of the ASP's cooperative environment.

This new method of delivering application training will be valuable for small companies that can hardly afford to dispatch part of their workforce for a few days or geographically remote companies for which travel costs are high.

Project data Management—The provision of application service implies co-location of the data with the application. As a result, the ASP opens interesting opportunity in terms of project data management, including traditional data loading, data validation and quality check as well as log splicing, and editing and migration of project data form one standard to another.

The offering of Local Application Service Provider (LSP) solutions also represents an opportunity for the ASP to provide a set of Information Technology (IT) services. By designing customized ASP inside solutions to specific customer requirements, the ASP can ensure a smooth transition from their legacy infrastructure and offer Assessment & design services—The objectives for the assessment and design phase are:

Using a customer-provided report, analyze the legacy infrastructure components and identify those that will be used a part of the new computing environment.

Assess the business requirements for the new system. More specifically, this assessment will address the needs in terms of security, connectivity, number of users, and mix of application served.

Recommend the appropriate ASP inside Solution.

Design an Implementation Schedule to serve as a roadmap for the implementation phase. The Implementation Schedule describes a series of steps that lead to the full implementation of the new computing environment.

Evaluate the financial impact involved in the migration towards the ASP's inside architecture. This will include the consulting fee related to the implementation phase as well as an estimation of the operating cost for the new system.

Implementation services—The objective of the implementation phase is to follow the Implementation Schedule adopted in the design phase in a manner that is both financially efficient and minimally disruptive for the customer's ongoing operations. This task includes:

The provision, installation and configuration of equipment and software necessary to build the new system.

The installation of content applications and migration of existing data sets.

The training of relevant customer IT personnel with respect to the new computing environment.

Turnkey management services—For those customers who wish to take an additional step in the direction of full IT outsourcing without releasing total control over the IT infrastructure, the ASP inside can also offer onsite management services such as data loading and quality check, application support and system and database administration.

Encryption is the process of using a mathematical algorithm to transform information into a format that can't be read by eavesdroppers. Decryption is the process of using another algorithm to transform encrypted information back into a readable format.

In the preferred embodiment, LiveQuest uses a 128 bit encryption based on a protocol called Secured Sockets Layer (SSL). The SSL protocol sits between the transport layer (TCP) and the application layer. An encrypted SSL connection requires all information sent between a client and a server to be encrypted by the sending software and decrypted by the receiving software, thus providing a high degree of confidentiality. TCP packets are encrypted using a "public" key located on the server and decrypted by the matching "private" key located on the client. This unique match between public and private keys ensures the privacy of the communication. Authentication 90 is the process through which the identity of every party involved in a transaction is made known to the other parties. It is the second step after the establishment of a secured connection. The present invention contemplates at least two methods for authenticating users. Username and Password will be available to customers, but Digital Certificates are preferred as the more secure method. These methods are listed below:

User Name and Password is the most common mechanism used to control access to computer systems, applications, and Internet portals. This system is widely used because it is simple, inexpensive, and convenient to use and implement.

Digital Certificates are electronic documents that are used to link information about the physical existence of an individual to its electronic existence. A certificate is a collection of information about the individual such as name, address and social security number. A Certificate Authority (CA) delivers them. When the CA generates a new certificate, a "key pair" is also created. The public key is store on a directory server 88 whereas the private key can be stored on the hard disk of the user s computer, or a smart card as part of the certificate. When a user wishes to log on to the system, the smart port authentication engine will request his certificate and check its validity by ensuring that the proper CA issued it. Then, the private key will be extracted from the certificate and checked against the public key for authentication 90.

Because the storage of certificates on hard drives would restrict users to a single machine and contradict the philosophy behind the present invention, smart cards are used as the recommended medium for storing certificates. A smart card is a highly secure computing platform and data store. It can be used to store user name and password, along with certificate information. Various commands and any standard digital ID can be stored on the smart card. In the case of smart cards available from the assignee of the present invention, the smart chip, which is embedded on the smart card, has a RAM of 32K, and can be personalized according to specific requirements. The use of public key infrastructure (PKI) in conjunction with smart cards will bring the following benefits:

Non-repudiation—The characteristic of transactions in which the participation of all parties in a completed transaction is attested to, such that none of the involved parties can either deny their participation, or disavow the detailed actions and decisions taken during their participation. Smart cards allow signature keys to be under user control, which is a requirement for non-repudiation.

Privacy—The characteristic of transactions or interactions in which only the participants are allowed to see and hear what is happening. No other entity is allowed to eavesdrop on the conversation.

Information integrity—The characteristic of transactions in which, during the flow of information from one party to another during the transaction, all parties trust that the information has not been compromised in any way.

Audit—the ability to track and record all messages sent in the network.

The use of smart port and public key encryption combined with the flexibility of smart cards will also provide a standard security platform shared across all web-based services of a particular ASP. For instance, in such a configuration, registered users of both the Schlumberger IndigoPool.com and LiveQuest services will only have to go through a new authentication process when entering an area with higher level of security. Apart from that process, users will be able to navigate seamlessly from one application service to another.

The Data Center provides physical hosting for the LiveQuest infrastructure. Security features can include the following:

Redundant network connections to the Internet 106.
Security controlled access by card key.
Video surveillance and security guards.
Designated work areas and detailed procedures.
Conditioned power with multiple uninterruptible supplies and redundant backup generators.
Redundant environment control systems maintaining constant temperature and humidity.
Fire suppression systems.
24 hours a day and 7 days-a-week server monitoring.

For the purpose of defining responsibilities and privileges, LiveQuest adopts a three-tier user structure comprising of managers, project managers and basic users. In the preferred embodiment described herein, the entitlement process is accomplished in two ways, depending on the authentication method that the client has selected.

In the full implementation, the client manager orders smart cards for all users through the ASP web site. Smart cards are sent by mail while the PINs are sent by email. The manager handles user administration tasks. He orders additional cards, modifies profiles or requests users to be deactivated. The manager also has privileged access to system performance and billing information through dedicated interfaces. He can however delegate part of those tasks to project managers. When given that privilege, project managers can perform user administration tasks for basic users of their project group. They can also monitor system performance and billing information pertaining to their project group. When given permission by project managers, basic users can use the system as per their subscription entitlement and perform low-level self-administrations tasks such as changing PIN.

In the light implementation, only managers use smart cards. Project managers and basic users authenticate with username and password. The light implementation provides an inferior level of security and non-repudiation can only be guaranteed for the manager. As a consequence the manager will have to carry on all user administration tasks without having the option of delegating lower level users.

By the use of the term "entitlement," it is intended to refer to the process through which user privileges are defined (e.g., via a policy server 96 as discussed with respect to FIG. 2), with respect to access to selected combinations of software modules. Central to the entitlement system is the InfoStore (10 of FIG. 1). The InfoStore is a database used as the repository of all customer information such as but not limited to registered users, subscribed software modules and subscription expiration dates. Users will access the InfoStore (10 of FIG. 1) through two interfaces:

Through the Shopping Cart 92 authorized customers will be able to construct bundles and select software modules for designated users and for specific subscription periods.

Through the User Administration Interface 94 authorized users will be able to perform the tasks described in the previous section according to the type of user management implementation chosen.

Authorization is the process through which one party of a transaction grants permission to another. When a logged-on user wants to use a new application, the InfoStore database is queried to verify his subscription information, and grant him access accordingly.

Monitoring—In a preferred embodiment, the ASP will have built in monitoring functions that will automate the collection information at different levels in order to serve multiple purposes. The collected data will be stored in the InfoStore (10 of FIG. 1) and be available to authorized users and/or authorized ASP personnel. The purpose and origin of this information is summarized in the following table:

|  | Billing | SLA and marketing | Operations management |
| --- | --- | --- | --- |
| Help Desk | Number and nature of ticket submitted. Billable time. | Nature of tickets and time required to close tickets per application and per category. | Load charts of help desk operators per application and per category. |
| Application | List of application subscribed. Number of users. Subscription period. | Maximum concurrency. | Total time spent by user and by applications. Change in number of subscribed users. |
| Hardware | Total CPU time per CPU category. Max storage space per user and company. | Uptime percentage for invoicing and contract period. | Disk space usage charts. RAM usage charts. CPU load charts. |
| Network | Total connect time per user and company. | Uptime per user and company. | Min, max & average load Charts per node |

Billing information gathered by the monitoring module, shopping cart 92 and user administration interface 94 is stored on the InfoStore (10 of FIG. 1). The billing module 86 will query this database to generate periodic bills. Billing information will be available at different aggregation level such as company, work group, individual users and application. Electronic bills can be prepared in a format that is compatible with the customer's ERP system and downloadable from the InfoStore by authorized users (i.e. client manager).

The present invention is also compatible with thin client architecture computing methods. Thin client architecture is a form of remote computing in which the central server performs all application functionalities. In this configuration, the local machine (client) (e.g., personal computer 102, laptop computer 104) only manages a few local resources such as mouse, keyboard and display adapter. While the application runs on the server, only its visual output is compressed and sent to the client. On the other side of the network connection, mice movements and keyboard strokes are captured and sent back to the server. Because the amount of data traveling back and forth is relatively small, the application can be used over the Internet 106 with good performance levels. Many software packages are available today to "web-enable" applications (i.e., access through a web interface 100). Among the most popular are METAFRAME™ from Citrix Systems and TARANTELLA from The Santa Cruz Operation. METAFRAME™ is a trademark of Citrix Systems, Inc. located in Fort Lauderdale, Fla. TARANTELLA® is a registered trademark of Sun Microsystems, Inc. located in Santa Clara, Calif.

In the following paragraphs, an implementation of the method and apparatus of the present invention is described having particular application to the users of the services provided by the assignee of the present invention, Schlumberger Technology Corporation, which provides a full range of oil and gas exploration and production applications. All of the trademarks set out in the following paragraphs are utilized in conjunction with Schlumberger proprietary products.

Collaboration tools—As a direct consequence of the ASP architecture, interpreters that are geographically spread out will be able to work on common projects. Everyone works on a single instance of the data that is constantly updated. The extent to which this form of collaboration will be able to take place will depend on the type of application required to complete the project and the available bandwidth to the data center.

Another set of collaboration tools will be available with the objective of improving communication between members of a project group. A control panel will allow users to see who within the company is connected to LiveQuest distinguishing those that belong to the project team from those who are not. The goal here is to create a company-wide online community of interpreters facilitated by the use of basic communications tools such as instant messages, email or bulletin boards.

Session shadowing—Session Shadowing allows users to export their displays to peers. The thin client architecture, which only conveys the video output from an application, is technically ideal to support this functionality. This video-sharing function will provide enhancement to the collaborative environment by allowing geographically dispersed users to see each other's work. This feature is especially valuable when two companies are jointly engaged in a project and need to make a common and time critical decision. In such a case, the ability to share displays will shorten the decision cycle and potentially, reduce travel costs. It is also a convenient tool for one-on-one training and remote customer demonstration or consultant who want to present their work without the hurdles of going to the client's office.

Resume function—The resume function will enable users to interrupt their work on any LiveQuest application while leaving a running session on the data center server. Taking advantage of the ubiquitous nature of the thin client architecture, users will be able to resume previously started sessions, possibly from a different location or even a different computer. The resume function will be valuable for telecommuters who essentially work from home but occasionally have to be in the office or globally mobile employees who work from hotel rooms or transportation that provide Internet connections. One situation in which the resume function will become a priceless feature is when using applications that require long and intensive processing but minimal user interaction such as the Eclipse reservoir simulator.

Interpretation consulting—With LiveQuest, access to consulting from Schlumberger/GeoQuest's Data & Consulting Services group will be a click away. Turnaround time to provide clients with answers should benefit form the ASP model, as data is already loaded and interpretation-ready. Also, in their interactions with customers, DCS consultants will use the interactive and collaboration tools described above making the process more fluid. They will be administered as any other users but will only be granted access to specific project on customer's request.

Help Desk—Getting assistance from the help desk is also facilitated by the ASP architecture. Help desk operators will be able to diagnose problems more rapidly by being able to access customers' projects and share their displays. Giving directions and providing remedies should also be facilitated by allowing help desk personnel to take control of the user's mice and keyboards.

Sending data to the Data Center—Sending tapes for loading using courier or overnight delivery services will remain an option. As promptness and predictability of data loading time can be expected to be key drivers of the trust relationship between ASP and their clients, LiveQuest will use a strict set of procedures to ensure that fulfillment of any loading ticket meets tight quality and performance criteria.

Additionally, an electronic inbox will be available to receive customer data that can be transmitted to the Data Center for loading. Such data transmission facilities will provide additional value for the clients and should be delivered as an additional service.

Stored data from POWERHOUSE—GeoQuest customers who use services from the data management centers will be in the best position to have their data loaded and interpretation-ready into the project environment. Those customers will be able to appreciate the fill advantages of the ASP model by benefiting from the short turn around time that is allowed by a LiveQuest-POWERHOUSE co-location and the availability of trained personnel with data loading expertise. The loading process will be triggered by an online ticket or secured email.

Purchased data from INDIGOPOOL.COM—Integration between INDIGOPOOL.COM and LiveQuest will facilitate access to the data libraries of third party data vendors. Customers using LiveQuest interpretation services will benefit from the SmartPort single sign-on features and be allowed navigate quickly towards their INDIGOPOOL.COM account to browse for data available for sale. Once the purchase is complete, clients will be able to instruct data vendors to deliver the tapes directly to the Data Center with standard loading instructions. If the vendor's data is stored online, he will able to use the electronic inbox described earlier.

Conversely, INDIGOPOOL.COM customers engaged in acquisitions will be able to use LiveQuest-powered decision tools such a Merak's PEEP or PORTFOLIO as part of their property evaluation workflow.

Acquired data from InterAct Web Witness—Today, customers wishing to view acquired log data in real-time may do so using a Schlumberger online service called Interact Web Witness (IWW). To enhance this service and reduce decision cycles further, IWW will provide LiveQuest-powered interpretation tools such as petrophysical or borehole geology applications to allow customers to make quick but informed decisions.

Although the inventions described herein are described in conjunction with the preferred embodiments that are illustrated in the figures, certain variations in those embodiments which are equivalents are intended to fall within the scope of the following claims.

The invention claimed is:

1. An application service provider apparatus, the apparatus comprising a server and a user smart card supplied by a first operator, the server being configured for providing a plurality of identified application services, wherein the plurality of identified application services include at least one selected from a group consisting of computer programs, computer software, one or more computer data-bases, hard-drive space and processing capability, the server being associated with a discriminator to receive and discriminate a first predetermined signal and a second predetermined signal, and wherein the first predetermined signal comprises a request to purchase selected services, and also being associated with a memory configured for:

storing the selected services of the plurality of identified application services, and storing a credit value corresponding to a quantity of time that the selected services are licensed, the server being configured, on receipt of the first predetermined signal from the first operator possessing a manager smart card, for:

receiving authentication from the manager smart card of the first operator, the authentication verifying that the first operator is permitted to specify the selected services of the plurality of identified application services, updating a logical copy of the user smart card, wherein the logical copy identifies the selected services selected by the first operator from the plurality of identified application services, and causing the discriminator to store a parameter relating to the user smart card, the server being configured, in response to the second predetermined signal from a second operator possessing the user smart card, for:

actuating the memory to provide the selected services to the second operator based on the logical copy, and decreasing the credit value based on an identity and a duration of the selected services provided.

2. The apparatus according to claim 1, wherein the server is connected to a computer, the computer being provided with means to generate at least one predetermined signal selected from a group consisting of the first predetermined signal and the second predetermined signal.

3. The apparatus according to claim 2, wherein the means to generate the first predetermined signal comprises functionality to provide authentication information of the first operator to the discriminator, wherein the first predetermined signal comprises the request to purchase the selected services, and wherein the selected services is purchased to be provided in response to the second predetermined signal.

4. The apparatus according to claim 2, wherein the logical copy comprises at least one selected from a group consisting of the identity of the selected services and the credit value to use the selected services, wherein the parameter is associated with authentication information of the user smart card, wherein the means to generate the second predetermined signal comprises functionality to provide authentication information of the user smart card to the discriminator, and wherein the second predetermined signal comprises a request to use the selected services based on the identity and the credit value stored in the user smart card.

5. The apparatus according to claim 4, wherein the server is further configured for causing an update usage statistics of the selected services to be stored in the user smart card and for charging the first operator according to the credit value and the update usage statistics, wherein the update usage statistics comprises the identity and the duration of the selected service provided.

6. The apparatus according to claims 4, wherein the means to generate the second predetermined signal is configured for reading the user smart card.

7. The apparatus according to claim 1, wherein the server is configured so that when the logical copy of the user smart card has been updated in response to the first predetermined signal, the server is responsive to signals from a computer to introduce the credit value into a further memory, and to associate the further memory with the discriminator.

8. The apparatus according to claim 1, wherein the user smart card is configured for storing an identity of project data associated with the selected services, wherein access to the project data is authorized based on the user smart card.

9. A method of providing an application service, comprising:

configuring a server with functionality to provide a plurality of identified application services selected from computer programs, computer software, one or more computer date-bases, hard drive space and processing capability;

providing means to enable a first operator possessing a manager smart card to provide a first predetermined signal to the server, the manager smart card providing authentication for the first operator to specify selected services from the plurality of identified application services;

updating a logical copy of a user smart card supplied by the first operator, wherein the logical copy comprises an identity of the selected services and a credit value to use the selected services, wherein the credit value corresponds to a quantity of time that the selected services are licensed;

storing a parameter in the server for authenticating the user smart card;

receiving and discriminating a second predetermined signal from the first predetermined signal;

providing the selected services to a second operator responsive to the second predetermined signal from the second operator possessing the user smart card, wherein the second predetermined signal comprises a request to use the selected services based on the identity of the selected services and the credit value stored in the user smart card; and decreasing the credit value based on the identity and a duration of the selected services provided.

10. The method according to claim 9, wherein the first predetermined signal comprises a request to purchase the selected services.

* * * * *